United States Patent
Gunn et al.

(10) Patent No.: US 11,728,843 B2
(45) Date of Patent: Aug. 15, 2023

(54) FREQUENCY HOPPING INTERFERENCE DETECTION USING DECODER CODEWORD METRICS

(71) Applicant: L3Harris Technologies, Inc., Melbourne, FL (US)

(72) Inventors: Joshua D. Gunn, Farmington, UT (US); Ryan W. Hinton, Erda, UT (US); Edwin J. Hemphill, Kaysville, UT (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 83 days.

(21) Appl. No.: 17/504,985

(22) Filed: Oct. 19, 2021

(65) Prior Publication Data

US 2023/0121235 A1    Apr. 20, 2023

(51) Int. Cl.
| | |
|---|---|
| *H04B 1/715* | (2011.01) |
| *H04B 1/7143* | (2011.01) |
| *H04B 17/318* | (2015.01) |
| *H04B 17/345* | (2015.01) |
| *H04B 1/7156* | (2011.01) |

(52) U.S. Cl.
CPC ........... *H04B 1/715* (2013.01); *H04B 1/7143* (2013.01); *H04B 17/318* (2015.01); *H04B 17/345* (2015.01); *H04B 2001/7152* (2013.01); *H04B 2001/71563* (2013.01)

(58) Field of Classification Search
CPC .... H04B 1/715; H04B 1/7143; H04B 17/318; H04B 17/345; H04B 2001/7152; H04B 2001/71563
See application file for complete search history.

(56) References Cited

U.S. PATENT DOCUMENTS

| | | | | |
|---|---|---|---|---|
| 5,048,057 A | * | 9/1991 | Saleh | H04L 27/186 455/60 |
| 5,259,030 A | * | 11/1993 | Francis | H04K 3/25 375/150 |
| 5,483,550 A | * | 1/1996 | Hulbert | H04B 1/713 370/335 |

(Continued)

OTHER PUBLICATIONS

Cheikh et al., "SAFH—Smooth Adaptive Frequency Hopping", 2011 Third International Workshop on Cross Layer Design, 2011.

(Continued)

*Primary Examiner* — James M Perez (74) *Attorney, Agent, or Firm* — Workman Nydegger (57) ABSTRACT

A method for mitigating interference in a frequency hopping channel system based on codeword metrics obtained during decoding of codewords. The method includes decoding a plurality of codewords using a particular error control coding method. Each of the plurality of codewords includes portions received from plurality of channels in the frequency hopping channel system. For each decoded codeword, one or more codeword metrics are obtained based on the cost of correcting errors during decoding of the plurality of codewords. Based on the codeword metrics, one or more channel metrics are inferred. Based on the inferred one or more channel metrics, a reliability metric of a particular channel is reduced, or incoming symbols received from the particular channel are ignored during decoding.

20 Claims, 5 Drawing Sheets

(56) References Cited

U.S. PATENT DOCUMENTS

| | | | | |
|---|---|---|---|---|
| 5,546,429 A * | 8/1996 | Chiasson | H04L 1/0059 | 375/E1.036 |
| 5,793,795 A * | 8/1998 | Li | H04B 1/715 | 714/784 |
| 5,794,128 A * | 8/1998 | Brockel | H04B 17/3912 | 455/67.11 |
| 5,832,026 A * | 11/1998 | Li | H04L 1/0057 | 375/136 |
| 6,731,700 B1 * | 5/2004 | Yakhnich | H04L 1/0054 | 375/341 |
| 6,873,601 B1 * | 3/2005 | Chow | H04W 24/00 | 370/254 |
| 7,046,644 B1 * | 5/2006 | Lappetelainen | H04W 72/54 | 370/335 |
| 7,100,101 B1 * | 8/2006 | Hemphill | H03M 13/2909 | 714/755 |
| 7,266,757 B1 * | 9/2007 | Mazahreh | H03M 13/3905 | 714/796 |
| 7,453,853 B2 * | 11/2008 | Haartsen | H04L 1/0072 | 370/335 |
| 7,529,288 B2 * | 5/2009 | Felbecker | H04B 1/715 | 375/133 |
| 7,636,399 B2 * | 12/2009 | Brown | H03M 13/2957 | 375/265 |
| 7,903,626 B2 | 3/2011 | Felbecker et al. | | |
| 8,223,904 B2 * | 7/2012 | Sampath | H04B 7/0817 | 375/232 |
| 8,537,877 B2 * | 9/2013 | Felbecker | H04B 1/715 | 375/133 |
| 9,197,365 B2 * | 11/2015 | Felix | H04L 1/005 | |
| 9,294,223 B2 * | 3/2016 | Webster | H04L 1/0054 | |
| 9,374,107 B1 * | 6/2016 | Hinton | H03M 13/114 | |
| 9,461,773 B2 * | 10/2016 | Chinnici | H04L 27/0014 | |
| 10,790,872 B1 * | 9/2020 | Blanchard | H04L 1/0054 | |
| 10,862,532 B2 * | 12/2020 | Fan | G05D 1/0022 | |
| 10,880,901 B2 * | 12/2020 | Abdelmonem | H04B 1/709 | |
| 10,972,147 B2 * | 4/2021 | Petkov | H04L 1/0001 | |
| 11,171,739 B2 * | 11/2021 | Xu | H04L 1/0061 | |
| 11,201,692 B2 * | 12/2021 | Qi | H03M 13/6306 | |
| 11,212,144 B1 * | 12/2021 | Guzelgoz | H04L 25/03286 | |
| 11,552,675 B1 * | 1/2023 | Lindsay | H04B 1/123 | |
| 11,601,216 B1 * | 3/2023 | Gunn | H04L 7/0062 | |
| 2002/0090938 A1 * | 7/2002 | Dharia | H04B 1/715 | 455/560 |
| 2002/0136268 A1 * | 9/2002 | Gan | H04W 72/542 | 375/133 |
| 2003/0031231 A1 * | 2/2003 | You | H04B 1/715 | 375/E1.036 |
| 2004/0213328 A1 * | 10/2004 | Mills | H04B 1/715 | 375/136 |
| 2005/0078614 A1 * | 4/2005 | Haartsen | H04L 1/0061 | 370/260 |
| 2005/0272434 A1 * | 12/2005 | Choi | H04B 1/715 | 455/450 |
| 2006/0013172 A1 * | 1/2006 | Ruuska | H04B 1/7143 | 370/338 |
| 2006/0133543 A1 * | 6/2006 | Linsky | H04B 1/715 | 375/350 |
| 2007/0030926 A1 * | 2/2007 | Brown | H04L 27/233 | 375/132 |
| 2007/0147539 A1 * | 6/2007 | Gorokhov | H04N 21/6405 | 375/295 |
| 2007/0217484 A1 * | 9/2007 | Leiby, III | H04L 25/069 | 375/136 |
| 2009/0097531 A1 * | 4/2009 | Franceschini | H04K 3/255 | 375/E1.033 |
| 2012/0020354 A1 * | 1/2012 | Gorokhov | H03M 13/2927 | 370/390 |
| 2012/0076173 A1 * | 3/2012 | Chang | H04B 1/7143 | 375/132 |
| 2012/0121034 A1 * | 5/2012 | Murakami | H04L 1/0014 | 375/295 |
| 2012/0224660 A1 * | 9/2012 | Lee | H04L 25/066 | 375/341 |
| 2015/0222391 A1 * | 8/2015 | Webster | H04L 1/0048 | 370/329 |
| 2019/0327463 A1 * | 10/2019 | Zhao | H04N 19/103 | |
| 2019/0372608 A1 * | 12/2019 | Wei | H03M 13/6362 | |
| 2020/0067566 A1 * | 2/2020 | Fan | H04B 17/336 | |
| 2020/0084775 A1 * | 3/2020 | Abdelmonem | H04W 24/10 | |
| 2020/0204207 A1 * | 6/2020 | Petkov | H04B 1/7143 | |
| 2020/0328776 A1 * | 10/2020 | Scholand | H04B 1/715 | |
| 2021/0036727 A1 * | 2/2021 | Kilian | H04B 1/1027 | |
| 2021/0075579 A1 * | 3/2021 | Liu | H04L 5/0055 | |
| 2021/0119666 A1 * | 4/2021 | Fan | H04B 1/713 | |
| 2021/0250121 A1 * | 8/2021 | Guzelgoz | H04L 1/0054 | |
| 2022/0232646 A1 * | 7/2022 | Hwang | H04W 52/02 | |
| 2023/0078796 A1 * | 3/2023 | Laraway | H04B 1/7115 | |

OTHER PUBLICATIONS

European Search Report received for EP Patent Application No. 22201822.8, dated Mar. 9, 2023, 11 pages.

Hsu et al., "Enhanced Adaptive Frequency Hopping for Wireless Personal Area Networks in a Coexistence Environment", IEEE GLOBECOM 2007—IEEE Global Telecommunications Conference, Nov. 2007, pp. 5.

Wenlong et al., "Adaptive frequency-hopping in HF communications", Proceedings 2011 International Conference on Transportation, Mechanical, and Electrical Engineering, Dec. 2011.

* cited by examiner

FREQUENCY HOPPING INTERFERENCE DETECTION USING DECODER CODEWORD METRICS

STATEMENT REGARDING FEDERALLY SPONSORED RESEARCH

This invention was made with Government support under PA No. PTSFD 400053849/1000 (102554) awarded by Space & Missile Systems Center. The government has certain rights in the invention.

BACKGROUND

Frequency-hopping is a method of transmitting radio signals by rapidly changing the carrier frequency among many distinct frequencies occupying a large spectral band. In particular, in a frequency-hopping communication system, the available frequency bandwidth is divided into smaller sub-bands (hereinafter also referred to as a "band" or a "channel"). Signals rapidly change (also referred to as "hop") their carrier frequencies among the center frequencies of these channels in a predetermined order. The changes are controlled by a pattern known to both transmitter and the receiver. Interference at a specific frequency will only affect the portion of the signal in the same channel as the specific frequency. As such, frequency hopping is highly resistant to narrowband interference, and signals are difficult to intercept if the frequency-hopping pattern is not known.

However, due to intentional or non-intentional interference, the transmission quality of each channel in a frequency-hopping system may be different at different times, and a particular channel may have a much worse transmission quality than the rest of the channels during a particular time period, which could worsen the transmission quality of the whole communication system. Existing technologies are able to measure the qualities of the channels directly, such as based on measuring the signal-to-noise ratios, and when the measured quality of a particular channel is sufficiently poor, the effect of the low-quality channel may be mitigated by reducing the usage of such a channel and/or allocating communications to plurality of channels.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The principles described herein are related to a wireless digital communication system and/or a method for mitigating interference and/or estimating the communication qualities of each channel in a frequency-hopping communication system based on codeword metrics obtained during decoding of codewords.

The method includes decoding a plurality of code blocks into a plurality of codewords using a particular error control coding method. Each of the plurality of code blocks includes portions received from a plurality of channels in the frequency hopping channel system. For each decoded code block, one or more codeword metrics are determined based on cost of correcting errors during the decoding of the plurality of code blocks. For example, the codeword metrics may include (but are not limited to) (1) a number of errors corrected during decoding of a code block, (2) a number of bits being flipped during decoding of a code block, (3) whether the code block is retransmitted, and/or (4) a number of iterations of an error correction process being performed during decoding of a codeword.

Based on the one or more codeword metrics of the plurality of codewords, one or more channel metrics of the plurality of channels are inferred. Based on the inferred channel metrics, a reliability metric of the channel is reduced, or symbols received from a particular channel are ignored. In some embodiments, the inferred channel metrics of a channel indicate a relative channel quality compared to an overall channel quality of all the plurality of channels.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The principles described herein are related to wireless digital communication systems. In particular, the principles described herein are related to using codeword metrics of a forward error correction (FEC) decoder with respect to difficulty in decoding codewords to infer interference and/or estimate transmission quality in a particular channel among multiple frequency hopping channels.

In a communication link, an FEC encoder maps an information word (composed of bits) or sequence, and one or more error correction bits, into a codeword or coded sequence of bits according to an FEC scheme. A transmitter (including a modulator) arranges these bits and maps them into messages composed of symbols. These messages may be split up into multiple segments (also referred to as sub-messages), where the segments are divided up for transmission over a plurality of different frequency channels. A receiver (including a demodulator) receives and processes the sub-messages from the various channels, reassembles the sub-messages into a sequence, and produces estimates of the symbols.

The estimated symbols in the sub-messages or messages are then translated into sequences of bits, which may be based on a soft or a hard decision method. For each transmitted codeword, a sequence of bits (also referred to as a code block) is reconstructed from the translated symbols. During the transmission of the symbols, the frequency channels may corrupt some of those symbols. Thus, the estimated symbols may not be the original symbols that were transmitted by the transmitter, and the code blocks may not be the original codewords.

Fortunately, most or all of the errors that occurred during transmission may be corrected by an FEC decoder. The FEC decoder processes the code blocks to provide an estimate of the transmitted codeword. The decoding process may also provide metrics about the quality of the received symbols (hereinafter also referred to as "symbol metrics") and/or the accuracy of the estimated codeword (hereinafter also referred to as "codeword metrics"). These metrics may be cheap or free (i.e., requiring little or no additional computations) as often they are an indication of the number of errors corrected. Based on the quality of the received symbols and/or the accuracy of the estimated codewords, a channel metric processor is able to infer the channel qualities of the multiple frequency channels and/or detect interference. Note, the translation from symbols to bits may or may not take place in the FEC decoder.

In some embodiments, based on the symbol metrics of the symbols that were transmitted via a particular frequency channel, or codeword metrics of codewords that were at least partially transmitted via a particular channel, one or more channel metrics may be inferred. The channel metric of a particular channel may be compared with an average channel metric of all the channels (or an average codeword metric of all the codewords transmitted via all the channels) to determine a relative channel quality of the particular channel. Alternatively, the channel metric may be monitored over time to determine a change from a baseline average channel metric for that particular channel. When the relative quality of the particular channel is worse than a threshold (whether that be a fixed threshold or changing threshold), the system may determine an interference is present. As a result, embodiments may reduce or stop using the particular channel and/or allocate communications to different channels.

Figure 1:
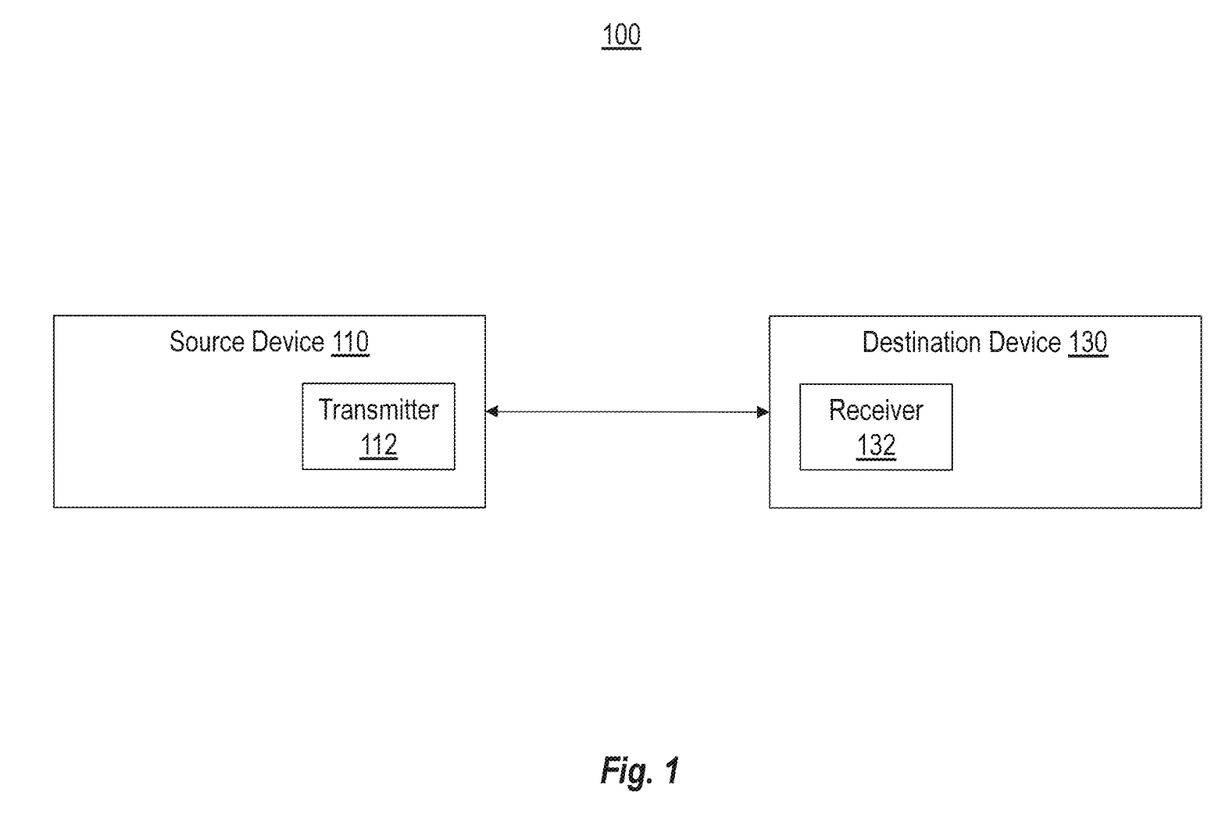
FIG. 1 illustrates an example of a wireless communication system.

FIG. 1 illustrates an example of an environment of a wireless communication system 100. The wireless communication system 100 includes one or more source devices 110, and one or more destination devices 130. Note that while the system is shown as a point-to-point communication system, other embodiments may be implemented in mesh networks where communications pass between various intermediary nodes. Thus, communications are not necessarily direct, as shown in FIG. 1. As illustrated, the source device 110 includes a transmitter 112 configured to send out a wireless signal having the destination device 130 as a destination. The destination device 130 includes a receiver 132 configured to receive the signal transmitted by the source device 110. In some embodiments, each of the source devices 110 and destination devices 130 may be a mobile phone, a tablet, a laptop computer, a radio, or any object that is coupled to a communication circuitry and/or device, such as (but not limited to) a ground vehicle, an airplane, a watercraft, and/or a satellite.

Figure 2:
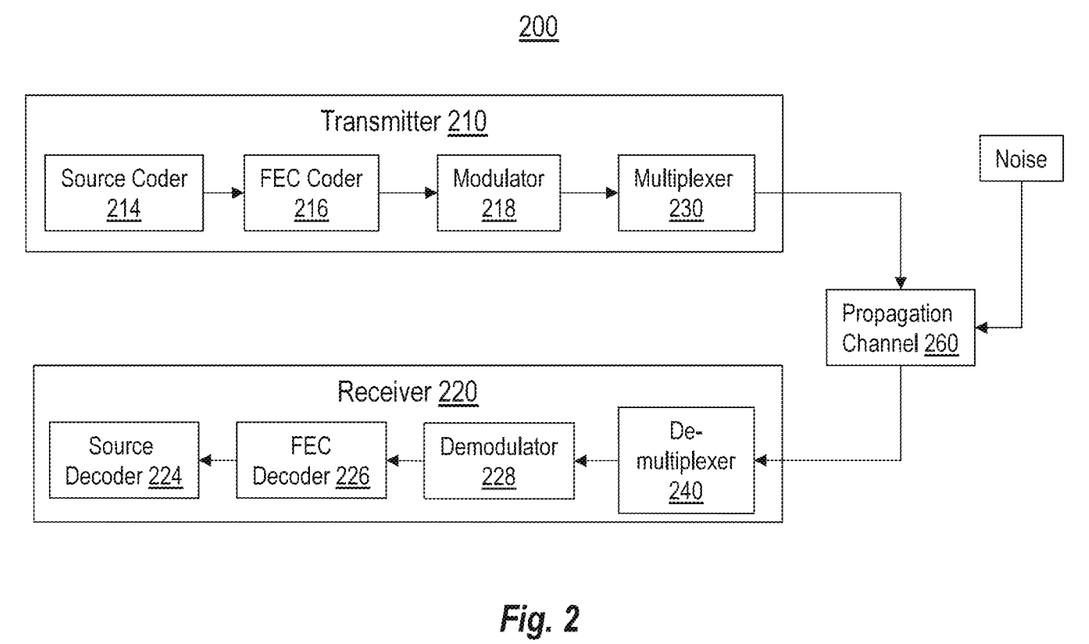
FIG. 2 illustrates an example of a communications link in a wireless communication system of FIG. 1.

In a wireless digital communication system, the transmitting and receiving of a signal in a link include many steps. FIG. 2 illustrates a functional block diagram of an example of a communications link 200, including a transmitter 210 and a receiver 220. The transmitter 210 includes a source coder 214, an FEC encoder 216, a modulator 218, and a multiplexer 230. The FEC encoder 216 is configured to add redundancy, for example, in a form for a forward error correction code, in order to provide information that can be used to correct transmission errors introduced by the channel 260. The receiver 220 includes a de-multiplexer 240, a demodulator 228, an FEC decoder 226, and a source decoder 224. The FEC decoder 226 is configured to eliminate most of the errors that may be present in the resulting bitstream. The FEC decoder 226 is also able to generate codeword metrics indicating the amount of error in a received block. As noted previously, this is cheaply obtained as it is essentially a measure of how much "work" the FEC decoder 226 needed to perform to correct received code blocks to arrive at the correct codeword. As will be illustrated in more detail below, these codeword metrics can be used to infer the quality of the propagation channel, and indeed as will be illustrated in FIG. 3 below, to infer the quality of individual channels of the propagation channel, such as when different channels are used in a frequency hopping system such as that illustrated in FIG. 3. Note, the functional blocks shown in FIG. 2 are oversimplified, and the separation of the functional blocks in embodiments are not necessarily the same as shown in FIG. 2. One or more of these functional blocks in FIG. 2 may be combined into a single electronic device, including complex circuitry, one or more generic processors and/or storages that are configured to execute custom or generic firmware and/or software to achieve the desired results.

Figure 3:
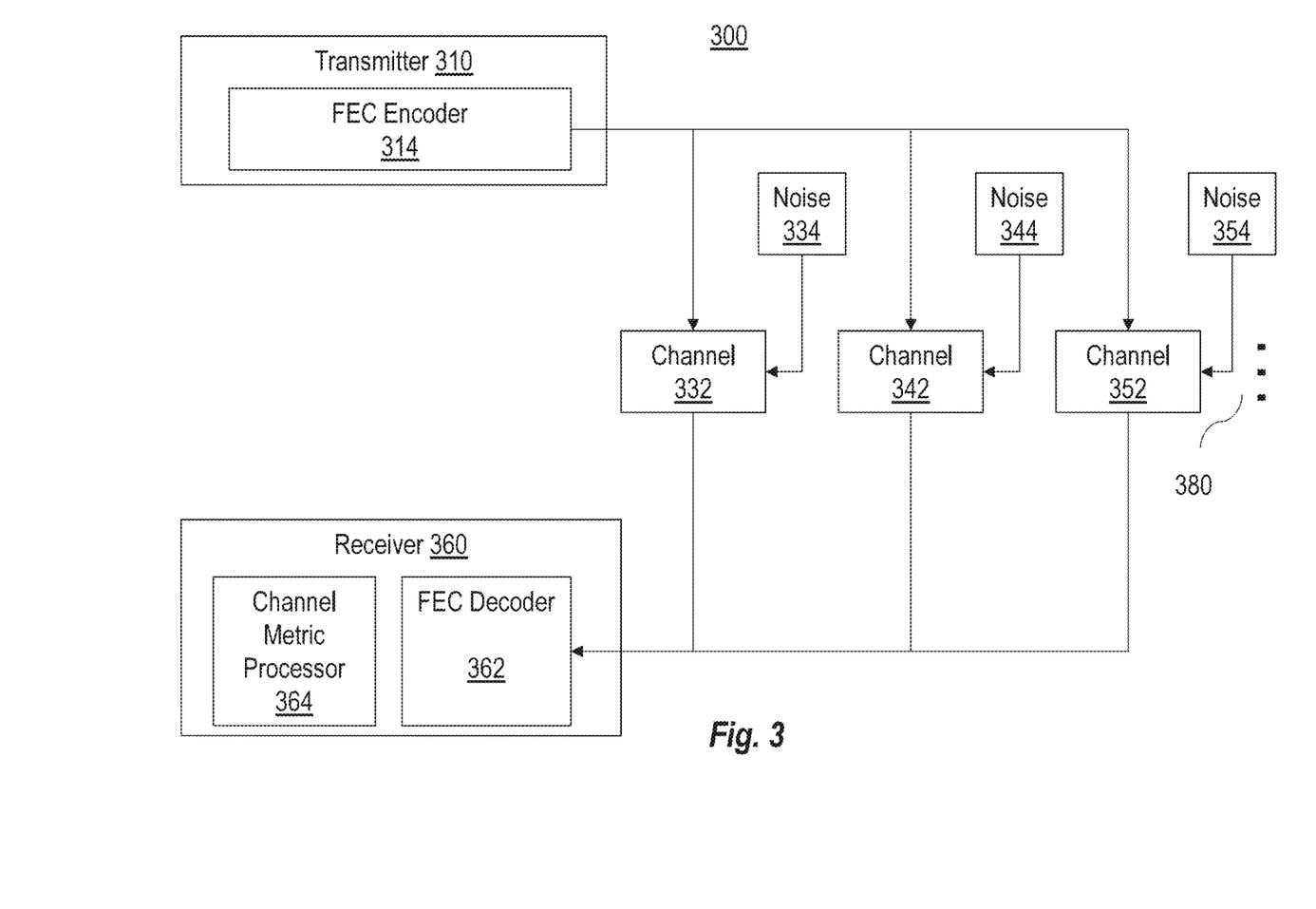
FIG. 3 illustrates an example of a frequency hopping communication system that implements the principles described herein.
Figure 4:
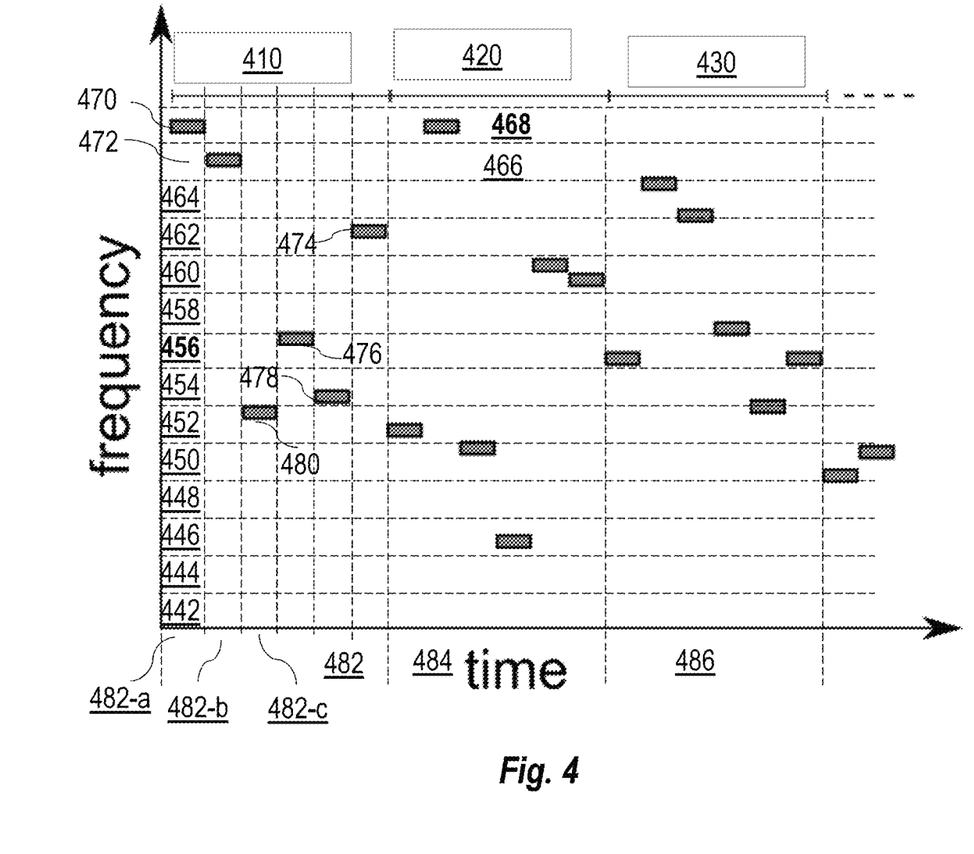
FIG. 4 illustrates an example of a frequency hopping process of transmitting three messages via multiple frequency channels.

FIG. 3 illustrates a functional block diagram of a frequency hopping system 300 that implements the principles described herein. FIG. 3 is shown as a more simplified version of the systems in FIG. 2 to focus on the particularities of the FEC encoding and decoding, and how that functionality can be used to infer channel quality for different frequency channels. The frequency hopping system 300 includes a transmitter 310 and a receiver 360. The transmitter 310 includes an FEC encoder 314 configured to encode digital information into codewords by encoding information words with redundant information to allow the FEC decoder 362 of the receiver 360 to detect a limited number of errors that may occur anywhere in the message, and often to correct these errors without retransmission. The encoded codewords are then modulated and multiplexed into signals having different frequencies. In particular, as noted previously, a particular codeword may be split up into different segments, such that different segments of the same codeword are transmitted over different channels, e.g., one or more of channels 332, 342, 352. The ellipsis 380 represents that there may be any number of channels in the frequency hopping system 300. As will be illustrated in more detail below, different codewords may be transmitted using different sets of channels. See e.g., FIG. 4 showing messages 410, 420, and 430 each having segments transmitted in different channels, and using different sets of channels for each codeword.

Notably, during the transmission of the signal, the channels 332, 342, 352 will corrupt the transmitted signals. For example, a wireless radio channel may attenuate and distort the signals and add noise 334, 344, 354 to the signals. The noise 334, 344, 354 may be random noise, cosmic radiation, intentional interference from jammers, unintentional interference (such as from other radio transmissions), etc., and/or a combination thereof. The amount of noise is often measured by signal-to-noise ratios. The lower the signal-to-noise ratio, the more transmission errors are likely to occur, and more error corrections must be performed during the decoding process by the FEC decoder 362. In particular, the various particular segments for each codeword will be reassembled into a code block which is then decoded by the FEC decoder 362 to attempt to recover the codeword.

In some embodiments, the FEC decoder 362 further includes a channel metric processor 364 configured to count the number for errors corrected during the decoding of the code block. The codeword metrics of the codewords that were transmitted via a particular channel can be used by the channel metric processor 364 to infer one or more channel metrics of the various channels 332, 342, and/or 352. In particular, knowing the codeword metrics (i.e., how difficult it was to decode a particular codeword) for a plurality of codewords, and knowing what channels were used to transmit code blocks for those codewords, the channel metric processor 364 can indirectly infer channel metrics for individual channels to identify channel qualities.

In response to detecting an unacceptable channel quality as determined by some predetermined threshold, the decoder 362 or the receiver 360 may then perform actions to mitigate the effect of the particular channel 332, 342, 352. In some embodiments, the receiver 360 may notify the transmitter 310 about the interference in the particular channel 332, 342, 352, causing the transmitter 310 to reduce the usage of the particular channel and/or allocate data transmission to different channels. In some embodiments, the receiver 360 may reduce the reliability (e.g., a reliability metric) of the particular channel and possibly ignore the symbols from the particular channel during decoding.

In some embodiments, the communications between the source device that hosts the transmitter 310 and the destination device that hosts the receiver 360 are in both directions. In such a case, each source device and destination device have both an encoder and a decoder. In response to detecting interference in a particular channel 332, 342, 352 by one of the decoders at the source and destination devices, one of the source or destination device may cause the other side or both sides to reduce the usage of the particular channel.

Note that inferring channel quality may occur over time based on collecting multiple codeword metrics. To prevent an accumulation of codeword and channel metrics from essentially causing a determination that all channels are of low quality and unsuitable for data transmission, some embodiments use relevant metrics compared to an overall channel quality (e.g., an average quality of all the channels). In some embodiments, a weighted average of codeword metrics and or channel metrics is used, where the weighting is performed based on time. That is, more recent codeword metrics and channel metrics have a higher weight than metrics that occurred more in the past. In this way, previous interference in a channel will not be weighted as high as current interference, and indeed such previous interference will have a decaying weight that eventually causes the interference to have little or no effect on determining channel quality.

FIG. 4 is a chart illustrating an example of a process of transmitting three messages 410, 420, 430 in a frequency hopping system. Each message 410, 420, 430 corresponds to a codeword. Referring back to FIG. 2, the FEC encoder 216 maps an information word (composed of bits) or bit sequence into a codeword or coded sequence of bits. The modulator 218 arranges these bits and maps them into messages composed of symbols. These messages may be split up into multiple segments, each of which is transmitted over a frequency channel. As illustrated in FIG. 4, messages 410, 420, 430 are examples of these messages that are split up into multiple segments (also referred to as sub-messages).

The vertical axis represents the overall frequency band, which has been divided into multiple sub-bands (i.e., channels 442-468). The horizontal axis represents a period of time, which is divided into periods 482, 484, and 486, during which each of the three messages 410, 420, and 430 is being transmitted. As illustrated, the message 410 is transmitted during the time period 482, message 420 is transmitted after the transmission of the message 410 during the time period 484, and the message 430 is transmitted after the transmission of the message 420 during the time period 486.

Further, each message 410, 420, 430 has been divided into 6 sub-messages, and each of which is transmitted via a different channel selected from the sub-channels 442-468 at a particular sub-time interval within the time interval 482, 484, or 486. In particular, the sub-messages of each message 410, 420, 430 are transmitted via different channels at different sub-time intervals at a predetermined sequence.

For example, message 410 has been divided into sub-messages 470-480. As illustrated, the sub-message 470 is first transmitted via the sub-channel 468 during the sub-time interval 482-$a$; the sub-message 472 is then transmitted via the sub-channel 466 during the sub-time interval 482-$b$; thereafter, the sub-message 480 is transmitted via the sub-channel 452 during the sub-time interval 482-$c$, and so on and so forth. Similarly, each of the messages 420 and 430 is also divided into 6 sub-messages, and each of those sub-messages is also transmitted via one of the sub-channels 442-468 during a sub-time interval based on a predetermined sequence.

The receiver processes the symbols of the sub-messages/messages and translates the symbols into sequences of bits. Notably, the sequence of the different sub-channels that are used to transmit the sub-messages is known to a receiver. Thus, the receiver can concatenate the sub-messages into messages or concatenate the sequences of bits corresponding to sub-messages into code blocks corresponding to codewords. The translation from symbols (via soft decoding and/or hard decoding) to bits may take place inside or outside the FEC decoder. The decoding process may also provide metrics about the quality of the received symbols (i.e., symbol metrics) and/or the accuracy of the estimated codeword (i.e., codeword metrics).

For example, at any given time, each of the channels 442-468 may have different transmission qualities. Generally, a worse channel quality would result in more errors in the decoding process. The principles described herein cause the FEC decoder or the receiver to account for the errors that occurred during the decoding of each codeword. The decoding errors are then analyzed to obtain one or more statistical metrics for each channel 442-468.

For example, for channel 468, during the time period 472-476, sub-messages in messages 410 and 420 were transmitted via the channel 468. However, no sub-message in message 430 was transmitted via the channel 468 during the same time period. If errors were detected in the process of decoding messages 410 and 420, but not message 430, this indicates that the channel 468 may be of poor quality, or interference may be present in the channel 468 during the time period 472-476.

As another example, for channel 456, during the time period 472-476, sub-messages in messages 410 and 430 were transmitted via the channel 456. However, no sub-message in message 420 was transmitted in the channel 456. If more errors were detected during the decoding of messages 410 and 430, but not fewer errors were detected during the decoding of message 420, this indicates that the channel 456 may be a bad channel, or interference may be present in the channel 456 during the time period 472-476.

This process may repeat for each channel 442-470, and one or more codeword metrics may be obtained based on the errors that occurred during the decoding of messages that at least partially transmitted via the corresponding channel. In some embodiments, the one or more codeword metrics of each channel includes a weighted average of multiple codeword metrics, where a greater weight is given to a codeword metric that is based on codewords received in a more recent time interval. In some embodiments, each of the plurality of codeword metrics is determined based on codewords received in each of multiple time intervals.

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

Figure 5:
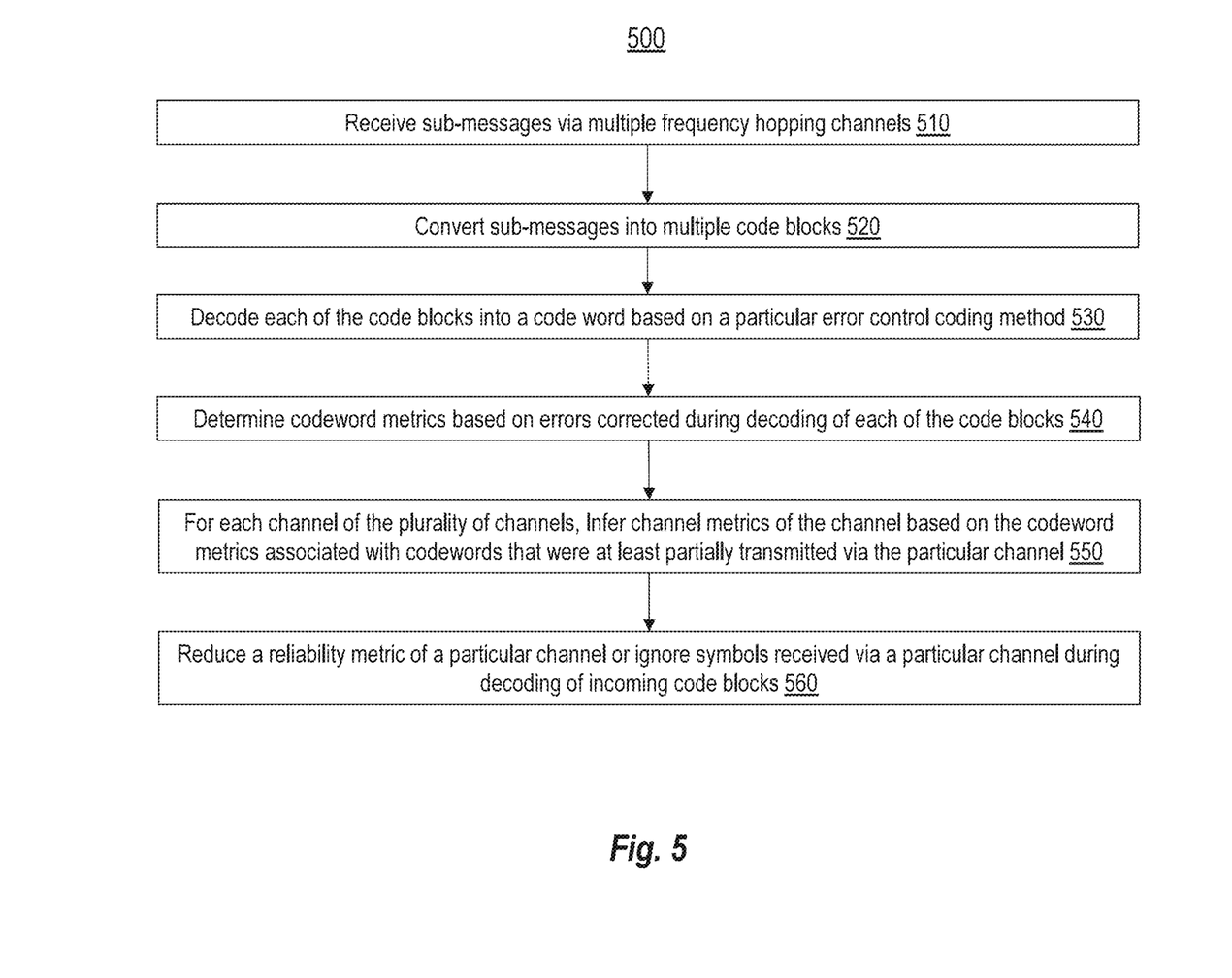
FIG. 5 illustrates a flowchart of a method for indirectly detecting interference of a frequency hopping channel based on decoding codeword metrics of the frequency hopping channel.

FIG. 5 illustrates a flowchart of an example method 500 for indirectly detecting interference in a particular frequency hopping channel based on one or more codeword metrics associated with messages that were at least partially transmitted via the particular frequency hopping channel. The method 500 may be implemented at the frequency hopping system 300 of FIG. 3, the receiver 220 of FIG. 2. The method 500 includes receiving sub-messages via multiple frequency hopping channels (act 510). Each of the sub-messages is transmitted via a particular frequency hopping channel. The method 500 also includes converting sub-messages into multiple code blocks (act 520). Each of the code blocks corresponds to a codeword. The method 500 further includes decoding each of the code blocks into a code word based on a particular error control coding method (act 530). Based on errors corrected during decoding of each of the code blocks, one or more codeword metrics are determined (act 540). For each particular channel of the plurality of channels, one or more channel metrics is inferred based on the codeword metrics associated with codewords that were at least partially transmitted via the particular channel (act 550). Based on the inferred channel metrics, a reliability metric of a particular channel is reduced, or symbols received via a particular channel is ignored during decoding of incoming code blocks (act 560).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for mitigating interference in a frequency hopping channel system based on codeword metrics obtained during decoding of code blocks, the method comprising:
    decoding a plurality of code blocks into a plurality of codewords using a particular error control coding method, each of the plurality of code blocks comprising portions received from a plurality of channels in the frequency hopping channel system;
    for each decoded code block, determining one or more codeword metrics based on cost of correcting errors during decoding of the plurality of code blocks;
    inferring one or more channel metrics of the plurality of channels based on the one or more codeword metrics of the plurality of codewords; and
    based on the channel metrics, reducing a reliability metric of a particular channel or ignoring incoming symbols received via a particular channel during decoding of code blocks.

2. The method of claim 1, wherein the one or more codeword metrics include a number of errors corrected during decoding of a code block.

3. The method of claim 1, wherein the one or more codeword metrics include a number of bits being flipped during decoding of the code block.

4. The method of claim 1, wherein the one or more codeword metrics include whether a code block is retransmitted.

5. The method of claim 1, wherein the one or more codeword metrics include a number of iterations of an error correction process being performed during the decoding of a code block.

6. The method of claim 1, the one or more channel metrics of a channel indicate a relative channel quality compared to an overall channel quality of all the plurality of channels.

7. The method of claim 6, the method further comprising determining an average channel quality of all the plurality of channels based on the one or more codeword metrics of all the plurality of codewords.

8. The method of claim 7, the method further comprising:
    aggregating codeword metrics of codewords that are at least partially transmitted via a particular channel; and
    inferring one or more channel metrics of the particular channel based on the aggregated codeword metrics and the average channel quality of the plurality of channels.

9. The method of claim 1, further comprising:
    computing a weighted average of codeword metrics of codewords that are at least partially transmitted via a particular channel, wherein a greater weight is given to a codeword metric that is based on codewords received in a more recent time interval.

10. The method of claim 7, the method further comprising:
    when the relative channel quality of a particular channel is lower than a threshold, determining that interference is present in the particular channel.

11. The method of claim 7, the method further comprising:
    in response to determining that interference is present, notifying a transmitter that has transmitted the codewords.

12. The method of claim 1, wherein the one or more channel metrics of each channel are inferred based on codeword metrics of codewords received in a predetermined time window ending at a current time.

13. The method of claim 1, wherein the particular error control coding method is one of (1) a low-density parity-check (LDPC) coding method, (2) a turbo coding method, or (3) a convolutional code.

14. A frequency hopping communication system comprising:
    an FEC decoder; and
    a channel metric processor; wherein:
    the FEC decoder is configured to:
        decode a plurality of codewords using a particular error control coding method, each of the plurality of codewords comprising portions received from a plurality of channels in the frequency hopping channel system;
        for each decoded codeword, generate one or more codeword metrics based on cost of correcting errors during decoding of the plurality of codewords;
    the channel metric processor is configured to:
    infer one or more channel metrics of the plurality of channels based on the one or more codeword metrics of the plurality of codewords; and
    based on the inferred one or more channel metrics, reduce a reliability metric of a particular channel or cause the FEC decoder to ignore incoming symbols received via a particular channel.

15. The frequency hopping communication system of claim 14, wherein the one or more codeword metrics include a number of errors corrected during decoding of a code block.

16. The frequency hopping communication system of claim 14, wherein the one or more codeword metrics include a number of bits of codewords being flipped during decoding.

17. The frequency hopping communication system of claim 14, wherein the one or more codeword metrics include whether a codeword is retransmitted.

18. The frequency hopping communication system of claim 14, wherein the one or more codeword metrics include a number of iterations of an error correction process that is performed on a codeword.

19. The frequency hopping communication system of claim 14, the channel metric processor further configured to
    compute a weighted average of codeword metrics of codewords that are at least partially transmitted via a particular channel, wherein a greater weight is given to a codeword metric that is based on codewords received in a more recent time interval; and
    infer one or more channel metrics of the particular channel based on the weighted average of codeword metrics.

20. A method for detecting interference in a particular channel of a plurality of frequency hopping channels based on codeword metrics obtained during decoding of codewords, the method comprising:
    receiving a plurality of symbols via the plurality of frequency hopping channels;
    converting the plurality of symbols into a plurality of codewords;
    decoding the plurality of codewords based on a particular error control coding method;
    for each decoded codeword, obtain one or more codeword metrics based on errors corrected during decoding of the codeword;
    for each particular channel of the plurality of frequency hopping channels,
        inferring one or more channel metrics of the particular channel based on (1) one or more symbol metrics associated with quality of symbols that were transmitted via the particular channel, or (2) the codeword metrics associated with messages that were at least partially transmitted via the particular channel;
        determining whether interference is present in the particular channel based on the inferred one or more channel metrics; and
        in response to determining that the interference is present in the particular channel, reducing a frequency of using the particular channel in future communications for a predetermined period.

* * * * *